United States Patent
Tsuji (10) Patent No.: US 8,203,936 B2
(45) Date of Patent: Jun. 19, 2012

(54) GATEWAY UNIT

(75) Inventor: Kiyotaka Tsuji, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 657 days.

(21) Appl. No.: 11/212,654

(22) Filed: Aug. 29, 2005

(65) Prior Publication Data

US 2006/0182088 A1   Aug. 17, 2006

(30) Foreign Application Priority Data

Jan. 25, 2005 (JP) ................................ 2005-017060

(51) Int. Cl.
*G01R 31/08* (2006.01)
*H04L 12/66* (2006.01)
*H04L 12/28* (2006.01)

(52) U.S. Cl. ........ 370/219; 370/220; 370/356; 370/400; 370/401

(58) Field of Classification Search .......... 370/219–220, 370/352–356, 400–401
See application file for complete search history.

(56) References Cited

U.S. PATENT DOCUMENTS

| | | | |
|---|---|---|---|
| 5,729,601 A | 3/1998 | Murai | |
| 6,111,852 A * | 8/2000 | Leung et al. | 370/217 |
| 6,747,985 B1 * | 6/2004 | Lovette | 370/460 |
| 6,999,411 B1 * | 2/2006 | Brewer et al. | 370/220 |
| 7,006,431 B1 * | 2/2006 | Kanekar et al. | 370/217 |
| 7,929,424 B2 * | 4/2011 | Kochhar et al. | 370/220 |
| 8,004,965 B2 * | 8/2011 | Karino et al. | 370/220 |
| 2002/0015487 A1 | 2/2002 | Asada et al. | |
| 2002/0044094 A1 * | 4/2002 | May | 343/703 |
| 2002/0061012 A1 * | 5/2002 | Thi et al. | 370/352 |
| 2002/0089926 A1 * | 7/2002 | Kloth | 370/220 |
| 2002/0089970 A1 | 7/2002 | Asada et al. | |
| 2003/0117949 A1 * | 6/2003 | Moller et al. | 370/219 |
| 2003/0118039 A1 * | 6/2003 | Nishi et al. | 370/401 |
| 2003/0169727 A1 * | 9/2003 | Curry et al. | 370/352 |
| 2004/0109438 A1 * | 6/2004 | Chen | 370/352 |
| 2004/0204123 A1 * | 10/2004 | Cowsky et al. | 455/565 |

FOREIGN PATENT DOCUMENTS

CN   1487702 A   4/2004
(Continued)

OTHER PUBLICATIONS

Notification of the First Office Action mailed on Nov. 23, 2007, from Chinese Patent Office in Chinese Patent Application 200510099105.8 (5 pages).

(Continued)

*Primary Examiner* — Brandon Renner
(74) *Attorney, Agent, or Firm* — Finnegan, Henderson, Farabow, Garrett & Dunner, L.L.P.

(57) ABSTRACT

A gateway unit for mutually connecting subscriber network, public switched telephone network (PSTN) and packet communication network, comprising subscriber network interface connected to subscriber network, PSTN interface connected to line exchange network, exchange unit exchange-connecting communication path among subscriber network, PSTN and packet communication network, control unit controlling connecting state of communication path at exchange unit, signal conversion unit converting form of signal transmitted and received between exchange unit and packet communication network into forms suitable for communication protocol of packet communication network and communication protocol of subscriber network, respectively, switching unit for route-controlling to transmit signal which is output from signal conversion unit toward destination in packet communication network, and information communication unit mediating information communications among subscriber network interface, PSTN interface, control unit, signal conversion unit and switching unit by using general-purpose local area network (LAN).

5 Claims, 5 Drawing Sheets

FOREIGN PATENT DOCUMENTS

| | | |
|---|---|---|
| JP | 11-046207 | 2/1999 |
| JP | 11-205831 | 7/1999 |
| JP | 2002-152250 | 5/2002 |
| JP | 2005-286971 | 10/2005 |

OTHER PUBLICATIONS

Notification of the Second Office Action mailed on Jun. 27, 2008, from Chinese Patent Office in Chinese Patent Application 200510099 1058 (8 pages).

Chuanjun, Tang, "Implementation of VoIP Gateway and Research for its Noise Restrain Delay Control Technology," Master Degree article in Hunan University, p. 10.

Notification of Reasons for Rejection mailed on Sep. 24, 2008, from Japanese Patent Office in Japanese Patent Application 2005-017060 with English translation (7 pages).

\* cited by examiner

GATEWAY UNIT

CROSS-REFERENCE TO RELATED APPLICATIONS

This application is based upon and claims the benefit of priority from prior Japanese Patent Application No. 2005-017060, filed Jan. 25, 2005, the entire contents of which are incorporated herein by reference.

BACKGROUND OF THE INVENTION

1. Field of the Invention

The present invention relates to a gateway unit used for connecting, for example, a public switched telephone network (PSTN) and an Internet protocol (IP) network with each other.

2. Description of the Related Art

In recent years, an information communication service including voice and data communication has become diversified. Resulting form this background, the number of carriers to newly enter a communication service field has increased and the intensity of service competition among carriers has increased. Such new carriers are called new common carriers (NCCs) and provide a variety of services by using a technique such as a voice over Internet protocol (VoIP). The VoIP is a technique to integrate a voice network and a data network by packetizing and transferring digital voice data.

In many cases, the NCCs are loaned facilities such as exchangers at a predetermined charge from a specific carrier already having a subscriber line. Many of the NCCs construct their own exchange networks such as IP networks by their own funds. The NCCs form communication systems by adding a PSTN of the specific carrier. These facilities are utilized in a compound manner for providing services to public users.

A gateway unit is used for connecting different communication networks such as the PSTN and the IP network with each other. This kind of gateway unit has an IP conversion unit for converting voice data and binary data into an IP packet and a packet switching unit for switching the IP packet. An example of this kind of gateway unit is disclosed in Jpn. Pat. Appln. KOKAI Publication No. 11-205831. This document discloses a button telephone main apparatus as an example of the gateway unit. This document also discloses a system formed by a bus topology. The information communication in the bus topology becomes half double communication.

By the way, an internal control system in this kind of gateway unit is often a unique system at every gateway unit vender and a low-speed transmission system such as serial transmission. The low speed of a data transmission speed inside the gateway unit causes the performance of processing to notify, for example, failure information to an external network managing device to deteriorate. In this case, the gateway unit makes the response of the network management slow in speed. In many cases, the gateway unit and a network management device to manage it are connected through the IP. Thereby, the adaptation of the unique system for the internal control system requires protocol conversion processing and makes the response of the network management further slow in speed.

BRIEF SUMMARY OF THE INVENTION

According to an aspect of the present invention, there is provided a gateway unit for mutually connecting a subscriber network, a public switched telephone network (PSTN) and a packet communication network, comprising a subscriber network interface connected to the subscriber network; a PSTN interface connected to the line exchange network; an exchange unit for exchange-connecting a communication path among the subscriber network, the PSTN and the packet communication network; a control unit for controlling a connecting state of the communication path at the exchange unit; a signal conversion unit for converting a form of a signal transmitted and received between the exchange unit and the packet communication network into forms suitable for a communication protocol of the packet communication network and a communication protocol of the subscriber network, respectively; a switching unit for route-controlling to transmit a signal which is output from the signal conversion unit toward a destination in the packet communication network; and an information communication unit mediating information communications among the subscriber network interface, the PSTN interface, the control unit, the signal conversion unit and the switching unit by using a general-purpose local area network (LAN).

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
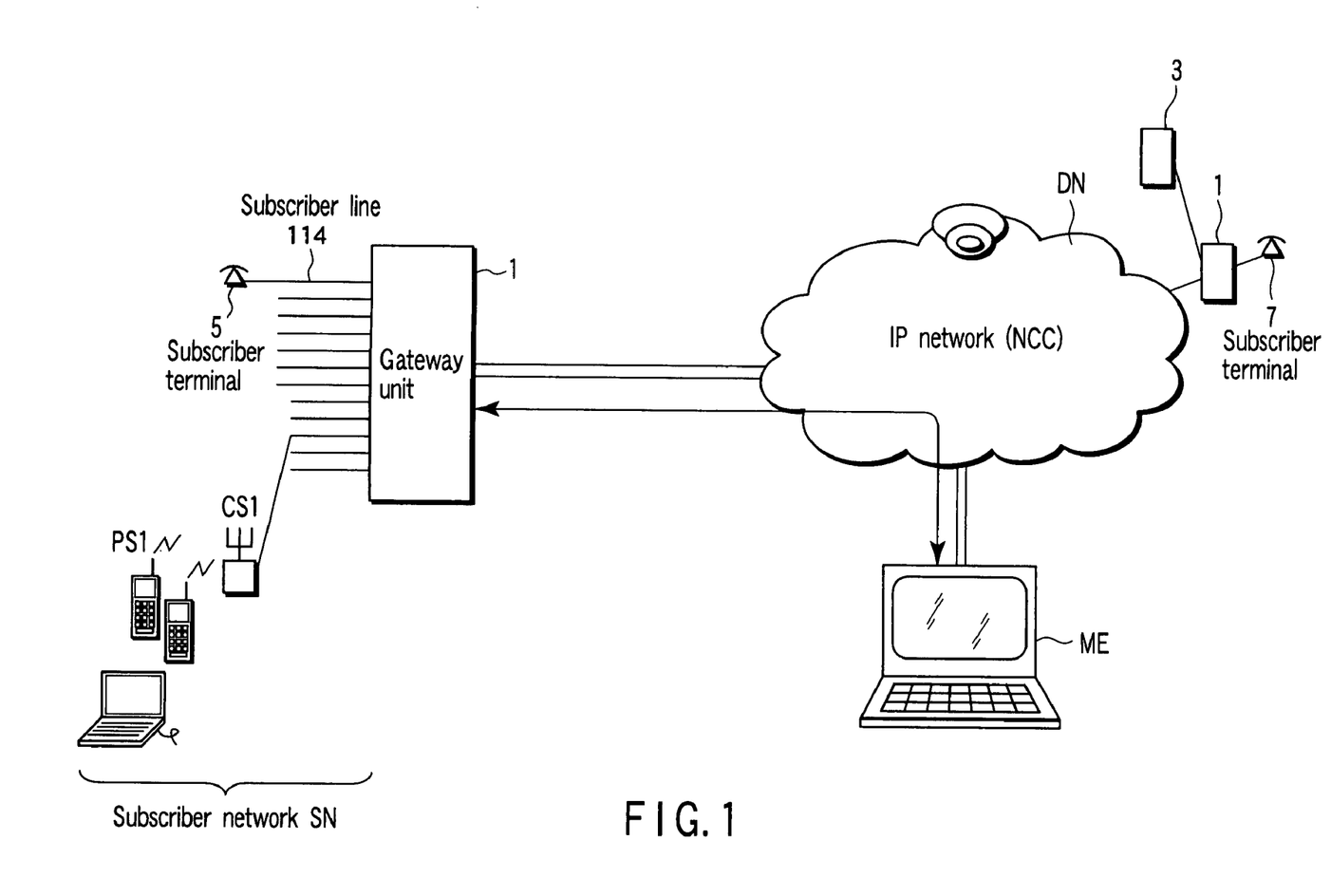
FIG. 1 is a system view showing an embodiment of a communication system regarding the present invention.

FIG. 1 is the system view showing the embodiment of the communication system regarding the present invention. In FIG. 1, a plurality of subscriber lines 114 of a subscriber network SN are housed in a gateway unit 1 at first. The gateway unit 1 is connected to an IP network DN. The IP network DN is a packet communication network and is formed as a unique network of a new common carrier (NCC) or the like. The Internet may be connected as the IP network DN.

The subscriber network SN includes a subscriber terminal 5, a base station CS 1 of a mobile phone system, a radio terminal PS 1, etc. The subscriber terminal 5 and the base station CS 1 are connected to the gateway unit 1 via subscriber lines 114. The subscriber lines 114 are access lines assigned for each of a plurality of subscriber terminals 5 and radio terminal PS 1.

The gateway unit 1 transmits a signal (a digital data signal such as voice data and video and image data) generated from the subscriber network SN to the IP network DN. The gateway unit 1 transmits a signal addressed to a terminal in the subscriber network SN from the IP network DN into the subscriber network SN to arrive at the terminal. Thereby, the gateway unit 1 can arbitrarily set an interactive communication path between a subscriber terminal 7 belonging to the IP network DN and the subscriber terminal 5, or the radio terminal PS 1 belonging to the subscriber network SN. Further, in the system in FIG. 1, network monitoring equipment ME is provided with the IP network DN. The monitoring equipment ME transmits and receives a variety of items of information to and from the gateway unit 1 via the IP network DN and mainly manages an operation state of the gateway unit 1.

Figure 2:
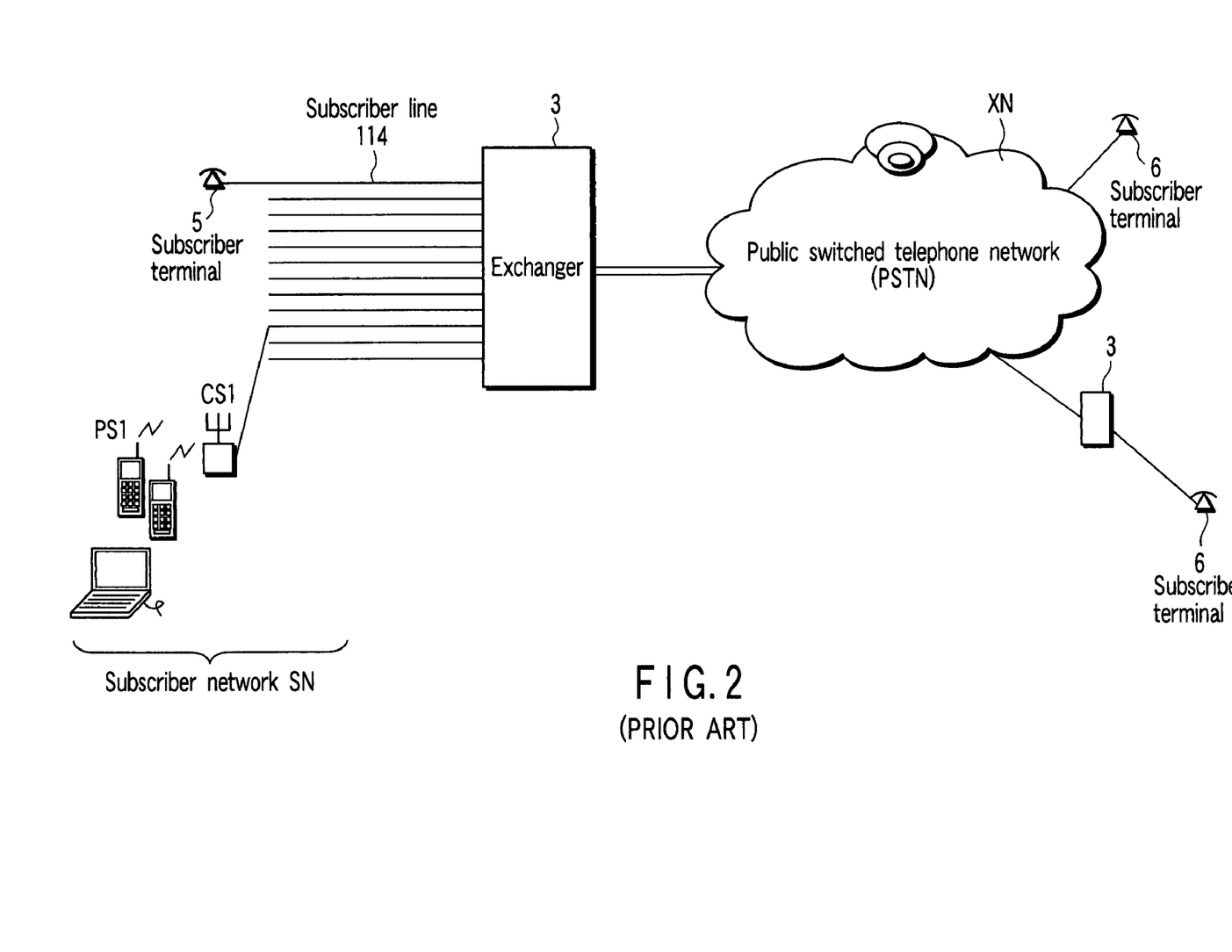
FIG. 2 is a system block diagram showing an existing voice communication system.

FIG. 2 is the system block diagram showing the existing voice communication system. In FIG. 2, the subscriber terminal 5 is housed in an exchanger 3 of a line exchange network XN via the subscriber line 114. The exchanger 3 is a facility belonging to the line exchange network XN. In the case of combination of the systems in FIG. 1 and FIG. 2, the gate way unit 1 is disposed on a subscriber terminal side rather than the exchanger 3. Therefore, a network-network interface (NNI) between the subscriber network SN and the line exchange network XN becomes a connecting point between the gateway 1 and the exchanger 3. That is, the gateway unit 1 is arranged on the subscriber network SN side rather than the NNI between the subscriber network SN and the line exchange network XN. Communication protocols of the subscriber network SN, the line exchange network XN and the IP network DN are different with one another.

Figure 3:
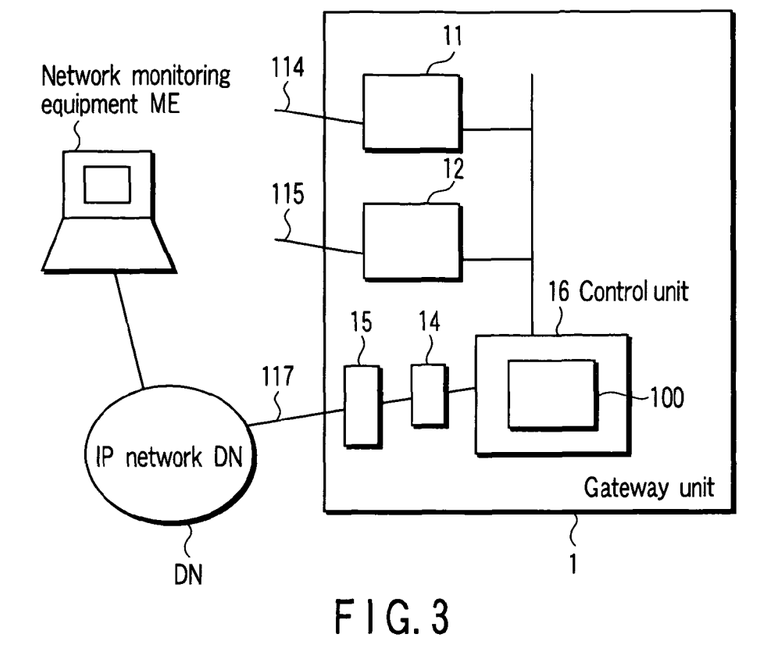
FIG. 3 is a functional block diagram showing an embodiment of a gateway unit 1 in FIG. 1.

FIG. 3 is the functional block diagram of the first embodiment in FIG. 1. In FIG. 3, the gateway unit 1 has a control unit 16 and a subscriber line interface 11 and a PSTN interface 12. The subscriber line interface 11 controls interface processing of the subscriber line 114 and the PSTN interface 12 controls interface processing of the subscriber line 115.

The subscriber line interface 11 houses the subscriber terminal 5 and the radio base station CS 1 via the subscriber line 114 to provide an exchange station side interface of an integrated service digital network (ISDN). The PSTN interface 12 is connected to a subscriber line 115 to provide a terminal side interface of the ISDN. A communication quantity of the subscriber line 115 is designed in advance on the basis of demand estimation of traffic.

The control unit 16 has the exchange unit 100. The exchange unit 100 exchanges and controls the communication paths among each subscriber line 114 and the IP network DN, respectively.

Further, the gateway unit 1 has an IP conversion unit 14 and a packet switch 15. The IP switching unit 14 is disposed between the control unit 16 and the IP network DN to convert protocols among networks. That is, the IP conversion unit 14 converts a time division multiplex signal supplied via other communication network (line exchange network XN, etc.) into an IP packet to input it to the packet switch 15. The IP packet is routed in accordance with a destination IP address to be transmitted to the IP network DN through a LAN cable 117. The IP conversion unit 14 converts the IP packet which is input through the LAN cable 117 and the packet switch 15 from the IP network DN into the time division multiplexing signal.

In FIG. 3, the number of housed lines of the subscriber lines 114 housed in the subscriber line interface 11 and the number of housed lines of the subscriber lines 115 housed in the PSTN interface 12 is equal with each other. Or the number of the housed lines of the subscriber lines 114 housed in the subscriber line interface 11 is made larger than that of the subscriber lines 115 housed in the PSTN interface 12. This manner has an advantage in system design. The number of the housed lines has the same meaning as the communication capacity.

The control unit 16 controls the gateway unit 1. That is, the control unit 16 requires to the interfaces 11 and 12 so that they control the subscriber lines 114 and 115. The control unit 16 notifies failure data detected by the interfaces 11 and 12 to the network monitoring equipment ME if necessary.

The control unit 16 of the gateway unit 1 is connected to the monitoring equipment ME via the IP network DN. The monitoring equipment ME acquires a variety of items of information from the control unit 16 to comprehensively manage it. According to this processing, the monitoring equipment ME can remotely monitor and manage the gateway unit 1.

In FIG. 3, the control unit 16 is connected to the IP network DN through the IP conversion unit 14 and the packet switch 15. The interfaces 11 and 12 and the control unit 16 have dedicated central processing units (CPUs) and memories (not shown), respectively, to be operated by computing processing of the CPUs, based on the programs stored in each memory.

Figure 4:
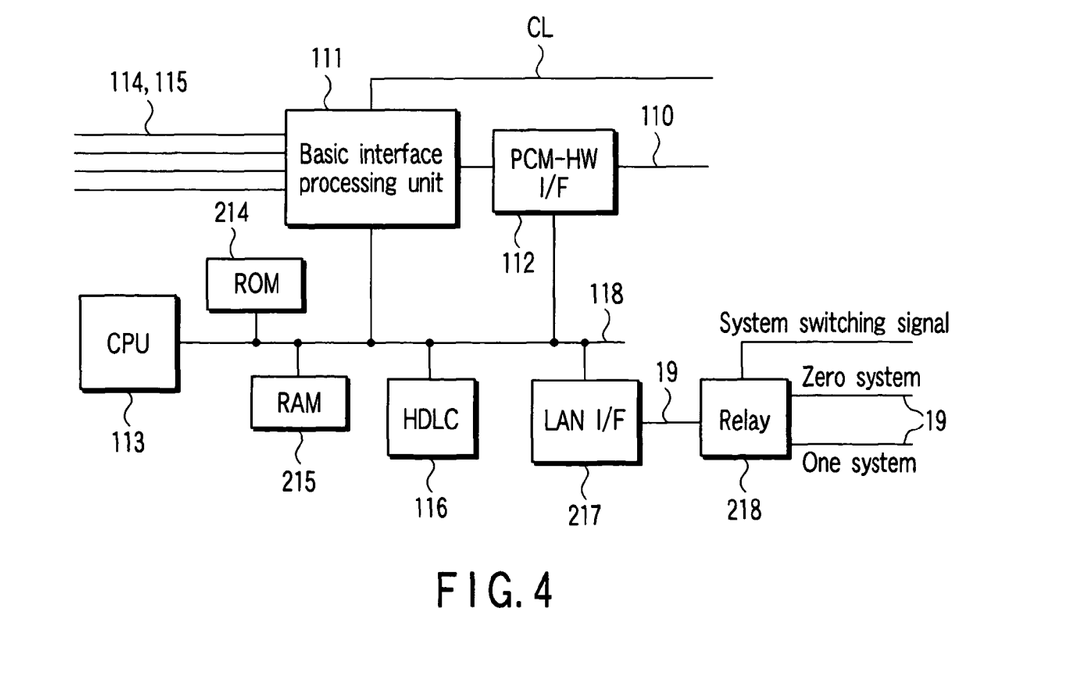
FIG. 4 is a functional block diagram showing main configurations of a subscriber line interface 11 and a PSTN interface 12 in FIG. 3.

FIG. 4 is the functional block diagram showing main configurations of the interfaces 11 and 12 in FIG. 3. In FIG. 4, the subscriber lines 114 and 115 are connected to a basic interface processing unit 111. The processing unit 111 operates on the basis of an internal clock given via a clock distribution line CL to terminate a switch station side interface (U interface) of the ISDN. That is, the processing unit 111 converts a signal in an ISDN format including B1 and B2 channels and a D channel into the time division multiplexing signal in which, for example, a plurality of time slots are byte-interleaved. This time division multiplexing signal is supplied to the exchange unit 100 through a PCM-highway interface (PCM-HW I/F) 112 to be an interface to the exchange unit 100. The B1 and B2 channels are used for transmission of voice data and link access procedure balanced (LAPB) data which is digitally coded. The D channel is used for transmission of a call control signal, a D channel packet, etc.

In addition, in FIG. 4, the subscriber line interface 11 has a CPU 113, a read only memory (ROM) 214, a random access memory (RAM) 215, a high level data link controller (HDLC) 116, a LAN I/F 217 and a bus line 118.

Each part in the subscriber line interface 11 is connected with one another via the bus line 118. The CPU 113 integrally executes a variety of kinds of control relating to operations of the subscriber line interface 11. The HDLC 116 processes the call control signal included in the D channel. The LAN interface 217 is connected to a relay 218 through an internal bus 19. The relay 218 connects the internal bus 19 of a zero system or a one system to the LAN I/F 217 in response to a system switching signal.

Figure 5:
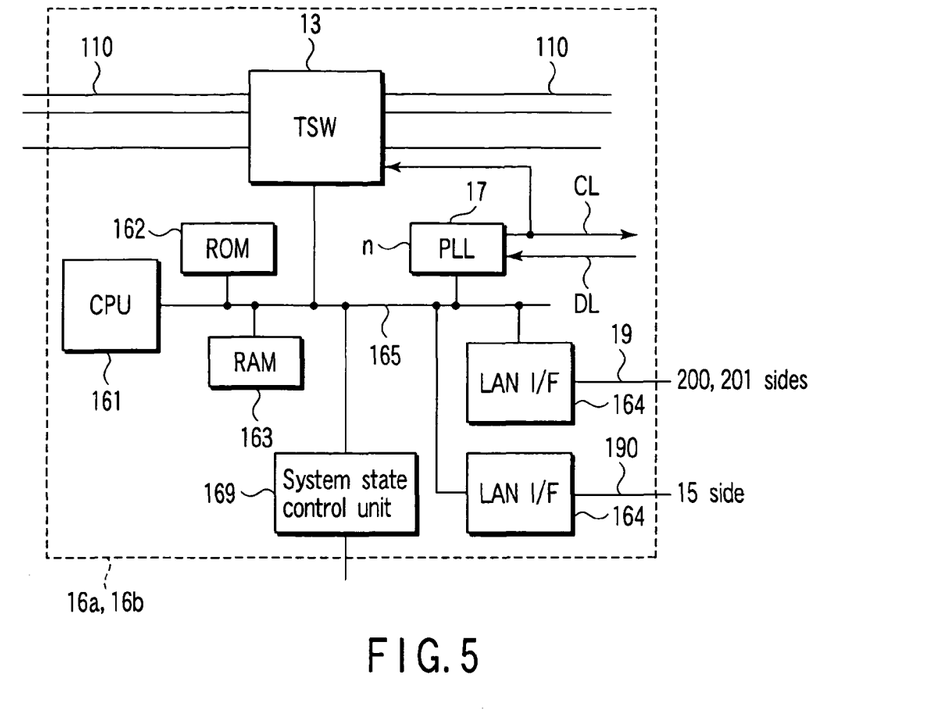
FIG. 5 is a functional block diagram showing a main configuration of an exchange unit 100 in FIG. 3.

FIG. 5 is a functional block diagram showing a main configuration of the control unit 16 in FIG. 3. The control unit 16 is doubled to the zero system control unit 16a and the one system control unit 16b as described later. In FIG. 5, a line exchange switch (TSW) 13 corresponds to the exchange unit 100 in FIG. 3. The TSW 13 is connected to the subscriber line interface 11, the PSTN interface 12 and the IP conversion unit 14 via a time division multiplexing bus 110. The TSW 13 interchanges time slots on the bus 110 in accordance with line connection setting. Thereby, communication paths among the interfaces 11 and 12 and the IP conversion unit 14 are switched and connected.

The control unit 16 integrally executes a variety of kinds of control relating to operations of the gateway unit 1 by the processing of the CPU 161 based on the control program stored in the ROM 162 and the RAM 163. In particular, the control unit 16 controls connection states of the communication paths at the TSW 13 on the basis of the communication quantity of the time division multiplexing bus 110 connecting the PSTN interface 12 and the exchange unit 100 and the communication quantity of the subscriber line 115.

A clock unit 17 selects an arbitrary subscriber line 115 as a master clock from the PSTN interface 12. The selected master clock is connected to the clock unit 17 via a clock supply line DL to supply the master clock to the clock unit 17. The clock unit 17 generates an internal clock synchronizing with a network clock from the master clock. The internal clock is distributed and supplied to each part of the gateway unit 1 via the clock distribution line CL. Thereby, the gateway unit 1 operates in synchronization with the network clock.

In addition, in FIG. 5, the control unit 16 has a LAN I/F 164 and a bus line 165. Each part in the control unit 16 are connected with one another via the bus line 165. The LAN I/Fs 164 are provided in two systems, one is connected to LAN switches 200 and 201 sides (described later) via the internal bus 19, the other is connected to a packet switch 15 side via an outer bus 190. Providing the LAN I/Fs 164 in two systems, enables to limit accessing between the general-purpose LAN and the IP network DN. Further, the control unit 16 has a series state controller 169. The controller 169 controls redundant switching between an active system (zero system) and a stand-by system (one system).

Figure 6:
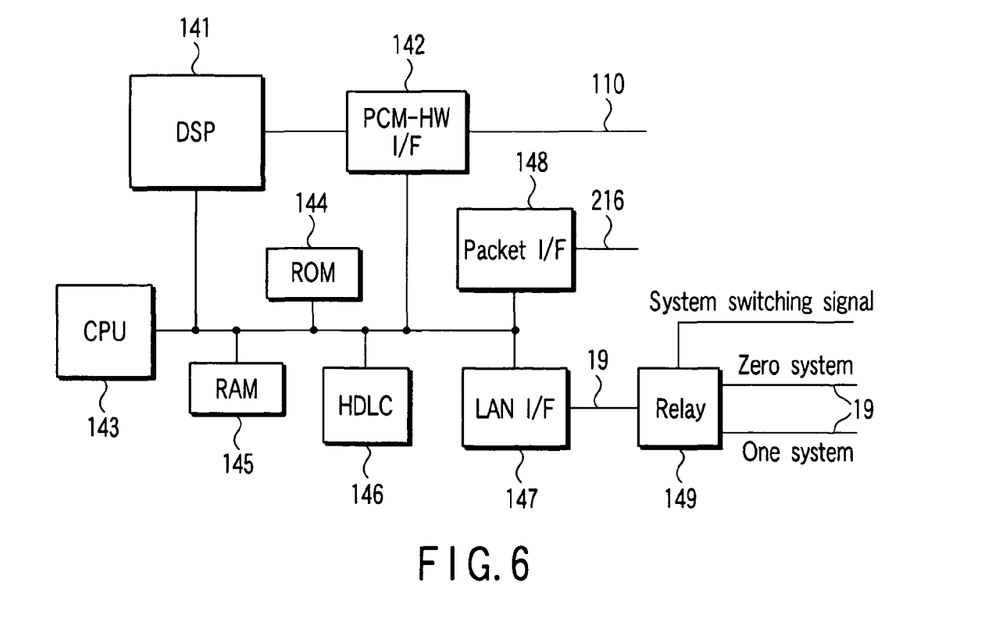
FIG. 6 is a functional block diagram showing a main configuration of an IP conversion unit 14 in FIG. 3.

FIG. 6 is the functional block diagram showing the main configuration of the IP conversion unit 14. In FIG. 6, the time division multiplexing data transferred from the exchange unit 100 via the time division multiplexing bus 110 is interface-processed by means of the PCM-HW I/F 142, after that, fed to a digital signal processor (DSP) 141. The DSP 141 packetizes the voice data.

The HDLC 146 processes the LAPB control signal to packetize it. The packet data generated from the DSP 141 and the HDLC 146 are output to the packet switch 15 from a packet I/F 148 via a serial bus 216. The CPU 143 integrally executes each kinds of control relating to operations of the IP conversion unit 14 on the basis of the control program stored in a ROM 144 and a RAM 145. A LAN I/F 147 transmits and receives a variety of signals to and from the control unit 16 via the internal bus 19. The LAN I/F 147 is connected to a relay 149 via the internal bus 19. The relay 149 connects the internal bus 19 of the zero system or the one system to the LAN I/F 147 in response to the system switching signal.

Figure 7:
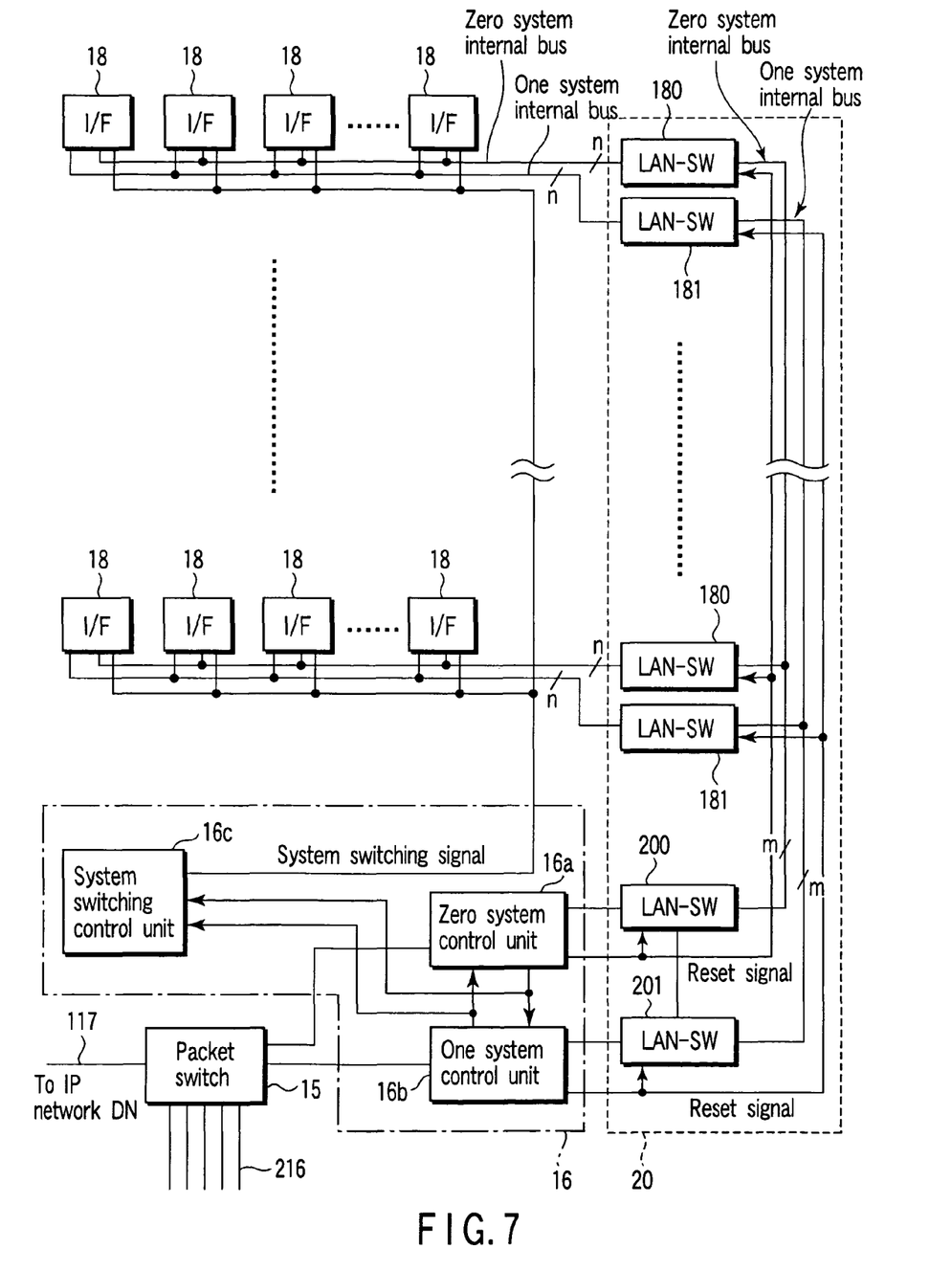
FIG. 7 is a detail view of the gateway unit 1 in FIG. 1.

FIG. 7 is the detail view of the gateway unit 1 in FIG. 1. In FIG. 7, any of the subscriber line interfaces 11 and 12 and the IP conversion unit 14 is mounted on the gateway unit 1, as a dedicated interface unit, respectively.

Line collecting unit 20 has a plurality of LAN switches (LAN-SWs) 180 and 181. The LAN-SWs 180 and 181 are counterpart with each other, and one operates as a redundant system of the other. The LAN-SW 180 is set as the zero system (active system) and the LAN-SW 181 is set as one system (stand-by system). Each interface unit I/F 18 is connected to the LAN-SWs 180 and 181 through a common communication interface, respectively and operation-controlled by a control packet supplied from either LAN-SW 180 or 181. Further, all LAN-SWs 180 are connected to a LAN-SW 200 via the zero system internal bus and all LAN-SWs 181 are connected to a LAN-SW 201 via the one system internal bus. The LAN-SWs 180, 181, 200 and 201 may be either switch of a layer 2 or a layer 3.

The LAN-SWs 180, 181, 200 and 201 autonomously notify their own state (failure state or statistics information) to the control unit 16. The control unit 16 integrally controls the LAN-SWs 180, 181, 200 and 201 on the basis of this notification information to determine whether communications between each interface unit I/F 18 and the control unit 16.

The control unit 16 has a zero system control unit 16a, a one system control unit 16b and a system switching control unit 16c. The control unit 16a is connected to the LAN-SW 200 and the one system control unit 16b is connected to the LAN-SW 201. The control unit 16c outputs system switching signal to each interface unit I/F 18 to switch-operate relays 218 (shown in FIG. 4) and 149 (shown in FIG. 6). The control units 16a and 16b are connected with each other to periodically transmit and receive information related to operation control of each interface unit I/F 18.

The control units 16a and 16b are connected to the packet switch 15, respectively. The packet switch 15 is connected to the IP network DN through a LAN cable. Thereby, the control units 16a and 16b can information-communicate with the network management equipment ME.

The control unit 16a has a function to reset the LAN-SW 180 by supplying a reset signal thereto. The control unit 16b has a function to reset the LAN-SW 181 by supplying a reset signal thereto. Any reset processing can be achieved by means of hardware.

In FIG. 7, the LAN-SWs 180 and 181 notify status signals indicating their own statuses to the control units 16a and 16b in response to polling requests, etc., respectively. The control unit 16 recognizes a driving state of the line collecting unit 20 to supply the control signal based on the recognition result to the control unit 16c. The control unit 16c outputs a system switching signal to switch the zero system and one system in the line collecting unit 20 by switch-controlling relays 218, 149 on the basis of the driving states of the LAN-SWs 180 and 181.

The zero system control unit 16a always performs health check of each interface unit I/F 18. As a result, if all interface units 18 under a certain LAN-SW become into failure states, the gateway unit 1 determines that the LAN-SWs are in abnormality, brings the control unit 16a into the stand-by system and brings the control unit 16b into the active system so as to operate them. The system switching control unit 16c varies the state of the system switching signal to switch between the zero system and the one system.

According to above-stated configuration, any interface unit I/F 18 is connected to the control unit 16 via the LAN. Thereby, among each interface unit I/F 18 and the control unit 16, for example, information communication in accordance with general-purpose LAN protocol based on the CSMA/CD can be achieved.

Accordingly, the gateway unit 1 can freely improve a data transfer speed and shorten times needed to acquire information and a variety of kinds of control. The gateway unit 1 can freely increase or decrease the number of wiring between LAN-SWs 200 and 180 (or LAN-SWs 201 and 181) in response to the number of lines housed in each interface unit I/F 18 and enhance its expandability.

According to above-mentioned configuration, the internal control paths from the control unit 16 to each interface unit I/F 18 are become redundant into the zero system and the one system, then, the LAN-SWs 180 and 181 and the control units 16a and 16b are connected to each interface unit I/F 18, respectively. Thereby, for example, in the state of operating of the zero system, even when a failure occurs in either the zero system control unit 16a or the LAN-SW 180, or in the internal bus 19, the gateway unit 1 can prevent the stop of the system and continue operations by stopping the zero system to switch the operations to the one system.

This embodiment can reset the LAN-SWs 180 and 181. In the case of the LAN-SWs 180 and 181 are layer 2 switches, a media access control (MAC) learning table occurs an abnormality at switching of redundancies to make a control communication to be sometimes interrupted.

Therefore, the gateway unit 1 can quickly re-start the control communication by resetting the LAN-SWs 180 and 181 at system-switching. Accordingly, the gateway unit 1 can be prevented from becoming instable as the control communication is disabled in a period of aging time and as the transmission and reception of the notification information between the interface units I/F 18 and the processing of detection of the failures are disabled.

The gateway unit 1 can synchronize information owned by both control units 16a and 16b by periodically transmitting and receiving the control information by means of the control units 16a and 16b by using the LAN-SWs 200 and 201. Thereby, for example, even if a redundancy switching has occurred from the state of operation of the zero system, information in a time interval until the system switches to the one system can be shared between the control units 16a and 16b. Accordingly, for example, even if the redundancy switching has occurred from the state of operating of the zero system, the gateway unit 1 can continue the operation without generating time-lag resulted from re-loading data at switching the redundancies.

Moreover, in the embodiment, an internal communication in the gateway unit 1 is achieved through the LAN, so that the affinity between the gateway unit 1 and the IP network DN can be further enhanced. That is, the gateway unit 1 only needs such a processing to the extent to convert an address of a packet header of the internal data so as to transmit information to the IP network DN. Thereby, the gateway unit 1 can further shorten the time necessary to data transmission without having to perform a complicated processing such as a protocol conversion.

As described above, according to the present invention, it becomes possible to provide a gateway unit for accelerate a speed of information transmission therein to improve processing performance. Further, it is eliminated for a control information packet to go around the LAN and malfunctions in control can be prevented by proving relays in each interface unit I/F 18, respectively.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A gateway unit which mutually connects a subscriber network including a base station wirelessly communicating with a mobile terminal, a public switched telephone network (PSTN) and a packet communication network and mediates the voice communication among the terminals belonging to each network, comprising:
    a subscriber network interface connected to the subscriber network;
    a PSTN interface connected to a line exchange network;
    an exchange unit for exchange-connecting a communication path among the subscriber network, the PSTN, and the packet communication network;
    a control unit for controlling a connecting state of the communication path at the exchange unit, the control unit including an active system control unit and a standby system control unit;
    a signal conversion unit for converting a form of a signal transmitted and received between the exchange unit and the packet communication network into forms suitable for a communication protocol of the packet communication network and a communication protocol of the subscriber network, respectively;
    a first processing unit for route-controlling to transmit a signal which is output from the signal conversion unit toward a destination in the packet communication network; and
    a second processing unit mediating internal information communications among the subscriber network interface, the PSTN interface, the control unit, the signal conversion unit, and the first processing unit by using a plurality of internal buses each being based upon a general-purpose local area network (LAN), wherein the second processing unit comprises:
        a first LAN switch connected to the subscriber network interface via the general-purpose LAN;
        a second LAN switch connected to the PSTN via the general-purpose LAN;
        a third LAN switch connected to the control unit via the general-purpose LAN; and
        a fourth LAN switch connected to the signal conversion unit via the general-purpose LAN, and
        the first to the fourth switches are connected with one another via the general-purpose LAN.

2. The gateway unit according to claim 1, wherein at least any one of the first to the fourth switches has an active system LAN switch and a stand-by system LAN switch to be made redundant, and
    further has a connecting unit for connecting the active system LAN switch and the stand-by system LAN switch via the general LAN to mediate an information communication between the active system LAN switch and the stand-by system LAN switch.

3. The gateway unit according to claim 1, wherein the first to the fourth LAN switches respectively have notifying units for autonomously monitoring self operation states to notify those results to the control unit via the general-purpose LAN.

4. The gateway unit according to claim 2, wherein the control unit has a function for individually resetting the active system LAN switch and the stand-by system LAN switch, respectively.

5. The gateway unit according to claim 2, wherein the active system LAN switch and the stand-by system LAN switch are connected with each other through a relay to be switched by a system switching signal at the subscriber network interface and the PSTN interface.

* * * * *